Dec. 21, 1965  J. A. FAHLEY  3,224,275
CONTROL APPARATUS
Filed April 9, 1963  2 Sheets-Sheet 1

INVENTOR.
JEROME A. FAHLEY
BY [signature]
ATTORNEY

Dec. 21, 1965    J. A. FAHLEY    3,224,275
CONTROL APPARATUS
Filed April 9, 1963    2 Sheets-Sheet 2

INVENTOR.
JEROME A. FAHLEY
BY Charles J. Ungemach
ATTORNEY

United States Patent Office 3,224,275
Patented Dec. 21, 1965

1

3,224,275
CONTROL APPARATUS
Jerome A. Fahley, Brooklyn Center, Minn., assignor to Honeywell, Inc., a corporation of Delaware
Filed Apr. 9, 1963, Ser. No. 271,695
8 Claims. (Cl. 73—304)

This application pertains generally to measuring systems and more particularly to fluid quantity measuring systems wherein the sensor is a capacitance, or conductivity, probe.

In the past, accurate measurement of fluid quantity by capacitance means has been limited to those fluids (a) whose electrical dielectric constant remains relatively stable under all environmental conditions and (b) whose electrical conductivity remains extremely low. Many attempts have been made to reduce the effects of high conductivity but none have been entirely successful. This invention successively solves this problem and thereby greatly extends the range of fluids which can be gauged by this means.

It is therefore an object of this invention to provide apparatus which will measure fluid quantities wherein the fluid varies over wide ranges of conductivity.

A more specific object is to provide apparatus which will measure fluid quantity by sensing capacitance in the presence of high and/or variable conductivity.

A further specific object is to provide apparatus which will measure fluid quantity by sensing conductivity in in the presence of high and/or variable dielectric constants.

Figure 1:
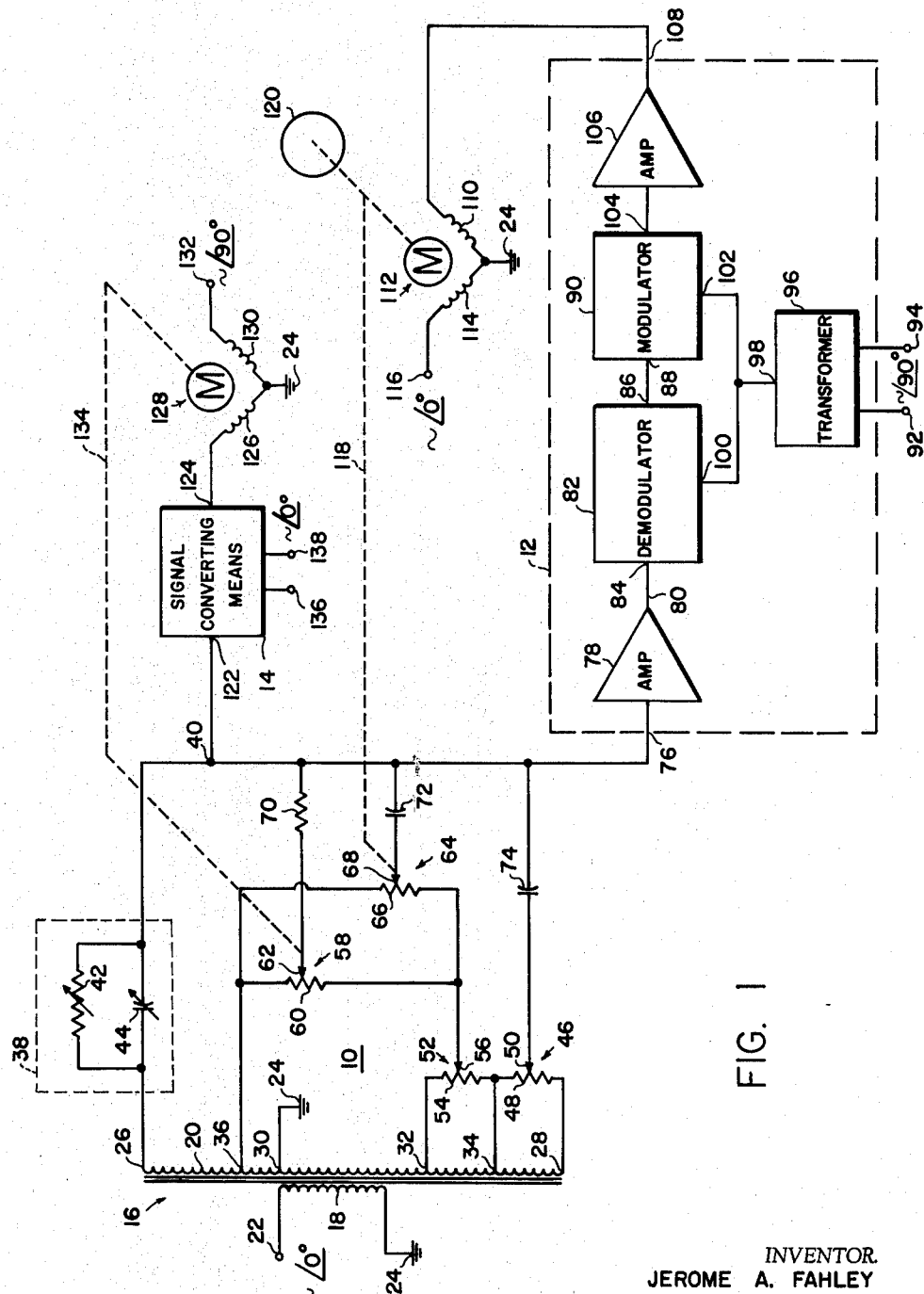
Figure 2:
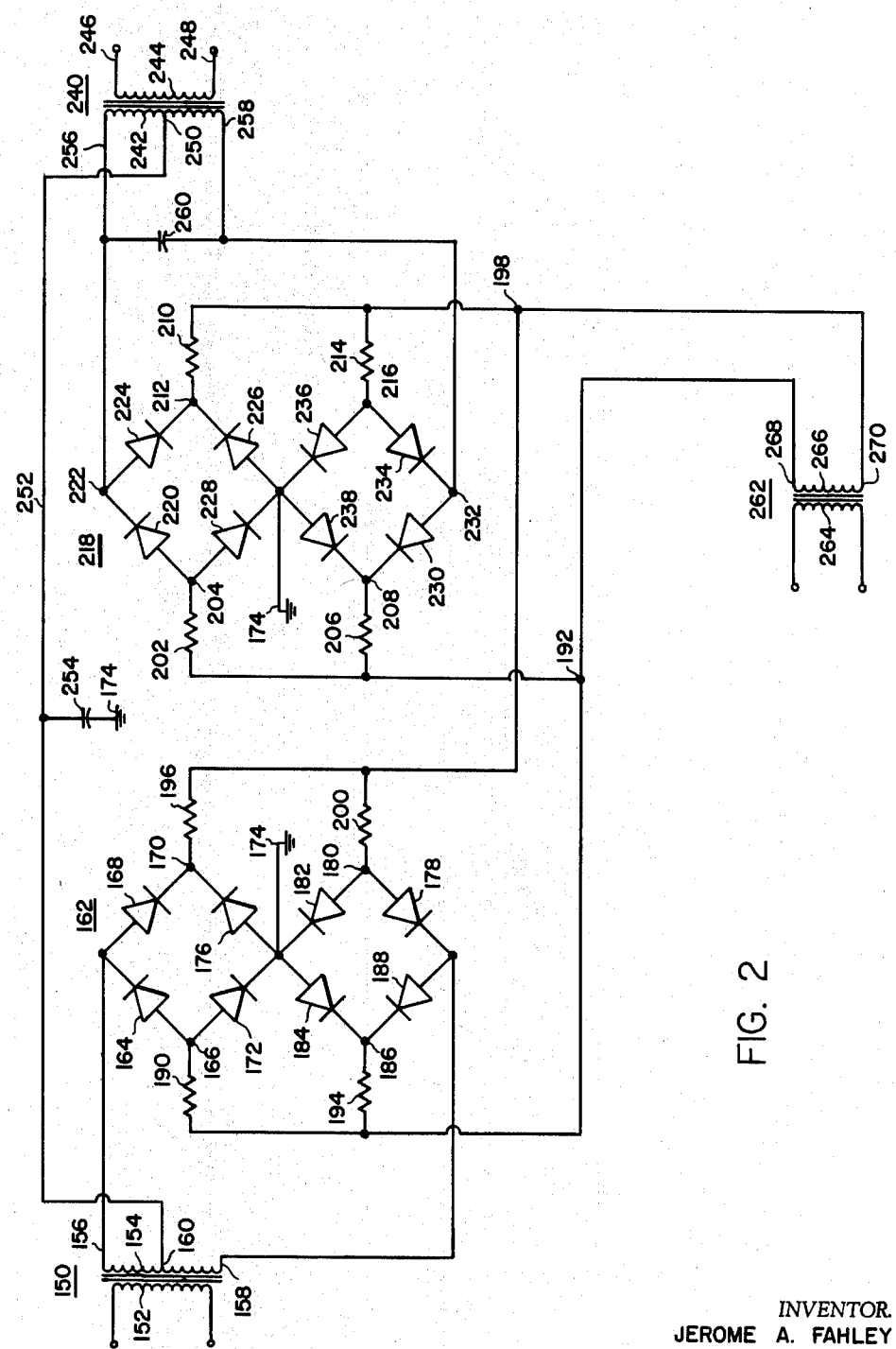

Further objects and advantages will be apparent from reading the specification and appended claims in conjunction with the drawings in which:

FIGURE 1 is a block diagram system representation of one embodiment of the invention, and FIGURE 2 is a schematic diagram of a phase sensitive filter portio nof the overall system diagram.

In FIGURE 1, a capacitive bridge circuit means or bridge network means generally designated as 10 has shown connected to it a group of boxes within a dashed line container termed a phase sensitive filter or signal converting means and designated 12. Also connected to the bridge 10 is another phase sensitive filter, signal converting means or block 14. The contents of block 14 may be the same as 12 or for some conditions of operation the block 14 may have only a portion (e.g., a single amplifier) of the components contained in block 12.

The bridge circuit 10 receives its power from a transformer generally designated as 16 which has a primary winding 18 and a secondary winding 20. The primary winding 18 is connected between an input terminal 22 and ground or reference potential 24. A source of power (not shown) is connected to primary winding 18 to supply a power signal having a phase of zero degrees. The secondary winding 20 has two end terminals or leads 26 and 28 with intermediate taps 30, 32, 34 and 36. The tap 36 is connected between the tap 30, which is connected to ground 24 and the lead 26. A sensor means or capacitive probe is designated generally as 38 and is connected between the lead 26 and a common summing point or junction means 40. The sensor means 38 in most fluids will consist of a resistive component 42 due to the fluid and a capacitive component shown as 44. In nearly insulative fluids the value of the resistor 44 which is here shown as being variable will be very high. By very high I mean somewhere in the order of several megohms. In highly conductive fluids the value of resistance 42 will be very low and may be in the order of only a few ohms. Depending upon the characteristics of the fluid or substance being measured the capacitive portion 44 of sensor 38 may vary from a large capacitance to a very small capacitance while the resistive component 42 remains relatively constant. In completely conductive fluid the only dielectric will be the insulation on the probes of the capacitive sensor 38 while the fluid between the sensor plates will act as a third electrode. This effectively makes two capacitors in series with the insulating material on each of the probes being the dielectric for the two series connected capacitors. A variable resistance or potentiometer generally designated as 46 has a resistance element 48 and a wiper 50. The resistance element 48 is connected between the tap 34 and the lead 28. Another potentiometer or variable resistance means 52 has a resistance element 54 and a wiper 56. The resistance element 54 is connected between the tap 34 and the tap 32. Taps 32 and 34 are between tap 30 to lead 28 with tap 34 being closer to lead 28 than tap 32. A third potentiometer or variable resistance element or rebalance means generally designated as 58 has a resistance element 60 and a wiper means 62. A fourth variable resistance element, rebalance means, or potentiometer generally designated as 64 has a resistance element 66 and a wiper 68. The resistance elements 60 and 66 are connected in parallel between tap 36 of transformer 16 and the tap 56 of potentiometer 52. A resistance element 70 is connected between the tap 62 of potentiometer 58 and the summing point 40. The capacitive element or capacitor means 72 is connected between the wiper 68 of potentiometer 64 and the summing point 40. Another capacitor or capacitive means 74 is connected between tap 50 of potentiometer 46 and summing point 40. The summing point 40 is connected to an input 76 of a block 12 which is immediately connected to an input of an amplifier or amplifying means 78. A lead 80 connects an output of the amplifying means 78 to a demodulating means 82 through an output 84. An output 86 of demodulator 82 is connected to an input 88 of a modulator means 90. Terminals 92 and 94 of block 12 are connected to a source of power (not shown) which has a phase of 90° with respect to the signal applied to primary winding 18. These terminals 92 and 94 are also connected to input transformer means or phase control means 96. If the signal applied to terminals 92 and 94 is of the same phase as the signal applied to primary winding 18 of transformer 16, a phase shifting network may be required in block 96 in addition to a transformer. An output 98 of block 96 is connected to an input 100 of demodulator 82 and also to an input 102 of the modulator 90. An output 104 of modulator 90 is connected to an input of an amplifier 106 whose output is connected to an output terminal 108 of block 12. Output 108 is connected to a winding 110 of a motor generally designated as 112. Another winding 114 of motor 112 is connected by means of a terminal means 116 to a source of power (not shown) having a phase of zero degrees. The motor 112 is connected by a mechanical connection shown as dashed lines 118 to the wiper 68 of potentiometer 64 and also to an indicator means 120. The summing point 40 is also connected to an input 122 of the previously mentioned block 14. An output 124 of block 14 is connected to a winding 126 of a motor generally designated as 128. Another winding 130 of motor 128 is connected to a terminal means 132 and from there to a source of power having a phase of 90° with respect to that appearing at terminal 22. This source of power is not shown. The motor 128 has its output connected through a mechanical connection shown as dashed line 134 to wiper 62 of potentiometer 58. As previously mentioned block 14 may contain substantially the same components as shown in block 12. The only change is that a reference signal supplied to terminals 136 and 138 on block 14 which correspond to terminals 92 and 94 of block 12 will have to be of a different phase to allow signals to be passed from junction point 40 to the winding 26. In other words, the signal applied to terminals 92 and 94 is such that capacitive signals will be passed through block 12 and applied to motor 112 which then rebalances the rebalancing means 64 to minimize the capacitive current supplied to the input 76. The phase of the signal applied between terminals 136 and 138 is such that only the resistive signal obtained from the resistive component 42 of sensor 38 is passed through the block 14 to the winding 126 of motor 128 to rebalance the rebalancing means or potentiometer 58 and thereby minimize the currents of that phase.

In FIGURE 2 the transformer generally designated as 150 has a primary winding 152 and a secondary winding 154. Secondary winding 154 has end leads 156 and 158 and an intermediate tap 160. The primary winding 152 is connected to receive an input signal not presently shown but which corresponds to input 84 of demodulator 82 in block 12 of FIGURE 1. Leads 156 and 158 connect between the ends of a demodulator unit generally designated as 162. A diode 164 is connected between the lead 156 and a junction point 166. A diode 168 is connected between the lead 156 and a junction point 170. A diode 172 is connected between the junction point 166 and ground or reference potential 174 which may be the same as ground 24 in FIGURE 1. A fourth diode 176 is connected between ground 174 and junction point 170. The diodes 164, 168, 172 and 176 are connected to provide easy current flow from the junction point 166 to the junction point 170. These diodes constitute one-half of the ring demodulator portion. A diode 178 is connected between the lead 158 of transformer 150 and a junction point 180. A diode 182 is connected between the junction point 180 and ground 174. A diode 184 is connected between ground 174 and a junction point 186. A diode 188 is connected between the lead 158 and the junction point 186. The diodes 178, 182, 184 and 188 are connected to provide a direction of easy current flow from junction point 180 to junction point 186 and these four diodes provide the other half of the ring demodulator 162. A resistor 190 is connected between the junction point 166 and a junction point 192. A resistor 194 is connected between junction point 186 and junction point 192. A resistor 196 is connected between the junction point 170 and a junction point 198. A resistor 200 is connected between the junction point 180 and the junction point 198. A resistor 202 is connected between the junction point 192 and a junction point 204. A resistor 206 is connected between the junction point 192 and a junction point 208. A resistor 210 is connected between the junction point 198 and a junction point 212. A resistor 214 is connected between the junction point 198 and a junction point 216. The last four resistors are a portion of a modulator generally designated as 218. The modulator 218 also contains eight diodes connected in a manner similar to that mentioned for demodulator 162. A diode 220 is connected between the junction point 204 and a junction point 222. A diode means 224 is connected between the junction point 222 and the junction point 212. The diode 226 is connected between the junction point 212 and ground 174. A diode 228 is connected between the junction point 204 and ground 174. The four diodes 220, 224, 226 and 228 are connected to provide a direction of easy current flow from junction point 204 to junction point 212 and these diodes constitute half of the modulator 218. A diode 230 is connected between the junction point 208 and a junction point 232. The diodes 234 is connected between the junction point 216 and the junction point 232. The diodes 236 is connected between ground 174 and the junction point 216. A diode 238 is connected between ground 174 and the junction point 208. A transformer generally designated as 240 has a primary winding 242 and a secondary winding 244. The secondary winding 244 has leads 246 and 248 which correspond to the output 104 of modulator 90 in block 12 of FIGURE 1. The primary winding 242 has an intermediate tap 250 which is connected by a lead 252 to the intermediate tap 250 which is connected by a lead 252 to the intermediate tap 160 of transformer 150. A capacitive element 254 is connected between the lead 252 and ground 174. The primary winding 242 has end leads 256 and 258. Connected between these two primary leads is a capacitor 260. The lead 256 is connected to the junction point 222 and the lead 258 is connected to the junction point 232. A transformer generally designated as 262 has a primary 264 connected to a source of power (not shown) and a secondary winding 266 with end leads 268 and 270. One end 268 of secondary winding 266 is connected to the junction point 192. The other end 270 of secondary winding 266 is connected to the junction point 198.

Operation

The operation of bridge circuit 10 is generally similar to that described in a patent to Franzel et al. 3,037,385, which is assigned to the same assignee as the present invention. A sketchy description of operation of this bridge circuit will be given and further details may be obtained from the above-mentioned Franzel et al. patent. In the bridge 10 the voltage which is supplied to capacitor 74 is adjusted until the current through capacitor 74 equals the current through the capacitive portion 44 of sensor 38 when there is no fluid between the electrodes of sensor 38. The current through capacitor 74 is adjusted by varying the position of wiper 50 on potentiometer 46. With no fluid between the electrodes of sensor 38, there is balance in the bridge circuit because the current through capacitor 74 completely balances the capacitive current through sensor 38 and there is no resistive current. If the sensor 38 is now placed in a full container of fluid and the rebalance means 64 is adjusted to its maximum voltage condition the wiper 56 can be adjusted so that the current through capacitor 72 equals the current through the sensor 38 due to the added capacitance of the fluid between the electrodes of the capacitive portion 44. If the fluid is completely insulative the rebalance means 58 will be at a minimum voltage condition and if the fluid is highly conductive the rebalance means 58 will be near its maximum voltage condition. In the highly conductive fluid condition a large amount of current will flow through the resistor 70. The purpose of the phase sensitive filter shown as block 14 is to amplify the resistive currents and move the output 134 of motor 128 so as to adjust the rebalance means 58 and minimize the resistive currents. If the resistive currents are not minimized, these currents will saturate the input of the amplifier 78 in block 12 when the fluid being measured is conductive enough to allow substantial resistive currents therethrough. If the fluid is a good dielectric or in other words is very insulative, there will be no problem. In this condition the capacitive signal from sensor 38 due to the fluid will be applied to amplifier 78 through the demodulator 82 to the modulator 90 and then to another amplifier 106 to turn the motor to adjust the wiper 68 of rebalance means 64 so that the capacitive currents are minimized. If a phase sensitive filter is used which does not saturate, this filter will allow only the capacitive component of the signal to be applied to amplifier 106 and to thus obtain a rebalance of the capacitive signals. With these conditions the block 14 with the associated motor 128 and the rebalance means 58 will not be needed. However, it is impractical if not impossible to design a nonsaturating phase sensitive filter. In some embodiments the block 14 does not have to have a phase sensitive filter but may instead have merely an amplifier to reduce the resistive currents low enough so that saturation of the amplifier 78 will not occur. However, for the utmost in accuracy, both blocks 12 and 14 will have phase sensitive filters contained therein so as to reduce both the resistive and the capacitive components of the signals to a minimum amount without saturating the driving amplifiers.

FIGURE 2 illustrates one embodiment of the phase sensitive filter portion of this invention. This consists of a fairly standard demodulator and modulator unit and the description of this unit will therefore be fairly brief. It may be assumed that the input signal is of such a character that it places lead 156 positive with respect to lead 158 at transformer 150. The control signal may be assumed to be such that the junction point 192 is positive with respect to terminal 198. This signal will back bias the four diodes constituting the lower part of the demodulator 162 and the lower part of the modulator 218. By the lower part of the demodulator 162 I mean the part containing the diodes 178, 182, 184 and 188. The corresponding portion of modulator 218 is also to be construed as the lower portion of the demodulator. The upper portions of the two units 162 and 218 will allow conduction since these diodes are placed in a state of conduction. The positive signal appearing at lead 156 will then flow through the diodes in the upper portion of demodulator 162 and out through ground 174 into the ground lead 174 of modulator 218 through the conducting diodes to junction point 222, through the upper portion of primary 242 and back to transformer 150 through the lead 250. On the next half cycle the lower half of the demodulator 162 and the lower half of the modulator 218 will became conductive to allow current through the lower half of the primary winding 242 of transformer 240. Signals which are 90° out of phase with the control signal appearing between junction points 192 and 198 will average out to zero between ground 174 and the tap 160 of transformer 150. Further information on the operation of demodulators and modulators may be obtained from articles such as appeared in the February 1954 Electronics magazine starting on page 188.

Since this demodulator-modulator unit passes only signals of one phase or the opposite phase, it is termed a phase sensitive filter network means. Actually, since the amplifier 78 is merely used to amplify the signal so it can be demodulated and since the amplifier 106 is merely used to amplify the output signal from the modulator 90 to run the motor 112, the entire unit 12 may be termed a phase sensitive filter network means.

In this specification and in the appended claims the term opposite phase or 180° out of phase when referenced to another signal merely means that the signal is of completely opposite electrical characteristics as the signal to which it is compared or with reference to time is 180 electrical degrees from the reference signal. This 180° may be either leading or lagging and is meant to be generally 180° or substantially 180° and not in all cases exactly 180°. The phase sensitive filter 12 may be termed a phase sensitive signal converting means either by itself or in conjunction with its associated motor 112.

The invention is not limited to the so-called three wire bridge as shown in FIGURE 1 but is intended to include all modifications thereof such as providing for dielectric compensation and various other modifications which are well known to those skilled in the art. The terms explained above are not to be limited as the only words having equivalents in the art. Further the words and phrases in the claims are intended to be used in their broadest scope and not limited to items shown in the illustrated embodiment.

I claim:

1. In fluid quantity apparatus comprising in combination:

first current source means including condition sensing means for supplying a first signal of an amplitude which varies with the quantity of fluid being sensed, the first signal having a capacitive component of a first phase and a resistive component of a second phase, and said second phase being displaced substantially 90° from said first phase;

second current source means for supplying a second signal of a phase opposite said first phase and a magnitude equal to that obtained from said first current source means when no fluid is being measured;

third current source means for supplying a third signal of a phase opposite said first phase and of variable magnitude;

fourth current source means for supplying a fourth signal of a phase opposite said second phase and of variable magnitude;

means connecting said first, second, third and fourth current source means to a common summing point means;

first amplifying means including input and output means, said input means being connected to said summing point means for receiving signals therefrom;

first demodulating means including input, output and control means, said input means being connected to said output means of said first amplifying means for receiving signals therefrom;

first modulating means including input, output and control means, said input means of said first modulating means being connected to said output means of said first demodulating means for receiving a demodulated signal therefrom, said output means of said first modulating means being adapted for supplying a first modulated signal;

first phase control means including output means connected to said control means of said first demodulating means and said first modulating means for supplying a first control signal thereto, said first control signal having characteristics so that only signals of the first phase are passed and demodulated and so that the first modulated signal is a function of the algebraic sum of the signals of the first phase appearing at said summing point means;

first motor means including input and output means, said first motor input means being connected to said first modulator output means for receiving a modulated signal therefrom, said first motor output means being connected to said third current source means and adapted to vary the magnitude of said third signal until the sum of the signal components of the first phase at said summing point means is adjusted to a minimum;

second amplifying means including input and output means, said input means being connected to said summing point means for receiving signals therefrom;

second demodulating means including input, output and control means, said input means being connected to said output means of said first amplifying means for receiving signals therefrom;

second modulating means including input, output and control means, said input means of said second modulating means being connected to said output means of said second demodulating means for receiving a demodulated signal therefrom, said output means of said second modulating means being adapted for supplying a second modulated signal;

second phase control means including output means connected to said control means of said second demodulating means and said second modulating means for supplying a second control signal thereto, said second control signal having characteristics so that only signals of the second phase are passed and demodulated and so that the second modulated signal is a function of the algebraic sum of the signals of the second phase appearing at said summing point means;

second motor means including input and output means, said second motor input means being connected to said second modulator output means for receiving a modulated signal therefrom, and said second motor output means being connected to said fourth current source means to vary the magnitude of said fourth signal until the sum of the signal components of the second phase at said summing point means is adjusted to a minimum; and indicator means attached to said output means of said first motor means to provide an indication indicative of fluid quantity.

2. In fluid quantity apparatus comprising in combination:

first current source means including condition sensing means for supplying a first signal of an amplitude which varies with the quantity of fluid being sensed, the first signal having a capacitive component of a first phase and a resistive component of a second phase, and said second phase being displaced substantially 90° from said first phase;

second current source means for supplying a second signal of a phase opposite said first phase and of magnitude equal to that obtained from said first current source means when no fluid is being measured;

third current source means for supplying a third signal of a phase opposite said first phase and of variable magnitude;

fourth current source means for supplying a fourth signal of a phase opposite said second phase and of variable magnitude;

means connecting said first, second, third and fourth current source means to a common summing point means;

first amplifying means including input and output means, said input means being connected to said summing point means for receiving signals therefrom;

demodulating means including input, output and control means, said input means being connected to said output means of said first amplifying means for receiving signals therefrom;

modulating means including input, output and control means, said input means of said modulating means being connected to said output means of said demodulating means for receiving a demodulated signal therefrom, said modulating means being adapted for supplying a modulated signal at said output means;

phase control means including output means connected to said control means of said demodulating means and said modulating means for supplying a control signal thereto, said control signal having characteristics so that only signals of the first phase are passed and demodulated and so that the modulated signal is a function of the signals of the first phase appearing at said summing point means;

motor means including input and output means, said motor input means being connected to said modulator output means for receiving the modulated signal therefrom, said motor output means being connected to said third current source means and adapted for varying the magnitude of said third signal until the sum of the signal components of the first phase and the opposite phase at said summing point means is at a minimum;

second amplifying means including input and output means, said input means being connected to said summing point means for receiving signals therefrom, said second amplifying means being responsive only to signals of the second phase and a phase substantially opposite said second phase, and said second amplifying output means being connected to said fourth current source means to vary the magnitude of said fourth signal until the sum of the signal components of the second phase and the opposite phase at said summing point means is at a minimum; and indicator means attached to said output means of said motor means to provide an indication indicative of fluid quantity.

3. In fluid quantity apparatus comprising in combination:

first current source means including condition sensing means for supplying a first signal of an amplitude which varies with the quantity of fluid being sensed, the first signal having a capacitive component of a first phase and a resistive component of a second phase, and said second phase being displaced substantially 90° from said first phase;

second current source means for supplying a second signal of a phase opposite said first phase and of magnitude equal to that obtained from said first current source means when no fluid is being measured;

third current source means for supplying a third signal of a phase opposite said first phase and of variable magnitude;

fourth current source means for supplying a fourth signal of a phase opposite said second phase and of variable magnitude;

means connecting said first, second, third and fourth current source means to a common summing point means;

first amplifying means including input and output means, said input means being connected to said summing point means for receiving signals therefrom;

first phase sensitive filter means including input and output means, said input means being connected to said output means of said first amplifying means for receiving signals therefrom;

first motor means including input and output means, said first motor input means being connected to said first phase sensitive filter output means for receiving a signal therefrom, said first motor output means being connected to said third current source means to vary the magnitude of said third signal until the sum of the signal components of the first phase and the opposite phase at said summing point means is at a minimum;

second amplifying means including input and output means, said input means being connected to said summing point means for receiving signals therefrom;

second phase sensitive filter means including input and output means, said input means being connected to said output means of said second amplifying means for receiving signals therefrom;

second motor means including input and output means, said second motor input means being connected to said second phase sensitive filter output means for receiving a modulated signal therefrom, said second motor output means being connected to said fourth current source means to vary the magnitude of said fourth signal until the sum of the signal components of the second phase and of the phase opposite said second phase at said summing point means is at a minimum; and indicator means attached to said output means of one of said motor means to provide an indication indicative of fluid quantity.

4. In capacitive type measuring apparatus comprising in combination:

first current source means including condition sensing means for supplying a first signal of an amplitude which varies with the quantity of a substance being sensed, the first signal having capacitive and resistive phase components;

second current source means for supplying a second signal of a phase opposite said capacitive phase component and of variable magnitude;

third current source means for supplying a third signal of a phase opposite said resistive phase of variable magnitude;

means connecting said first, second and third current source means to a common summing point means;

amplifying means including input and output means, said input means being connected to said summing point means for receiving signals therefrom;

demodulating means including input, output and control means, said input means being connected to said output means of said amplifying means for receiving signals therefrom;

modulating means including input, output and control means, said input means of said modulating means being connected to said output means of said demodulating means for receiving a demodulated signal therefrom, said output means of said modulating means being adapted for supplying a modulated signal;

phase control means including output means connected to said control means of said demodulating means and said modulating means for supplying a control signal thereto, said control signal having characteristics so that signals of the capacitive phase and the phase opposite said capacitive phase are demodulated and so that the modulated signal is a function of the sum of the signal components of these two phases appearing at said summing point means;

first motor means including input and output means, said first motor input means being connected to said first modulator output means for receiving the modulated signal therefrom, said first motor output means being connected to said second current source means to vary the magnitude of said third signal until the sum of the signal components of the capacitive and opposite phases at said summing point means is at a minimum;

second motor means including input and output means, said input means being connected to said summing point means for receiving signals therefrom, said second motor means being responsive to said signal components of the resistive phase and to signal components substantially 180° from said second phase, and said second motor output means being connected to said third current source means to vary the magnitude of said third signal until the sum of the signal components of the second phase and phase opposite the second phase at said summing point means is at a minimum; and indicator means attached to said output means of one of said motor means to provide an indication indicative of fluid quantity.

5. In a capacitive measuring system wherein the characteristics of the substance being measured may vary from insulative to conductive comprising, in combination:

bridge circuit means including sensor means, output means and first and second rebalance means, said sensor means being adapted for supplying resistive and capacitive signal components of first and second phases, the relative value of these components being indicative of the characteristics of the substance being measured, said first rebalance means being adapted for supplying a first rebalance signal having a phase substantially 180° from said first phase, said second rebalance means being adapted for supplying a second rebalance signal having a phase substantially 180° from said second phase;

first phase sensitive signal converting means including input means and output means, said input means of said first phase sensitive signal converting means being connected to said output means of said bridge circuit means for receiving said signals therefrom, said output means being attached to said first rebalance means for varying the magnitude of said first rebalance signal until the algebraic sum of the signal components of said first phase and substantially 180° out of phase with said first phase are reduced to a minimum amount, said first phase sensitive signal converting means being responsive only to signals of the first phase and to signals substantially 180° out of phase from said first phase;

second phase sensitive signal converting means including input means and output means, said input means of said second phase sensitive signal converting means being connected to said output means of said bridge circuit means for receiving said signals therefrom, said output means being attached to said second rebalance means for varying the magnitude of said second rebalance signal until the algebraic sum of the signal components of said first phase and substantially 180° out of phase with said first phase are reduced to a minimum amount, said second phase sensitive signal converting means being responsive only to signals of the second phase and to signals 180° out of phase from said second phase; and indicator means attached to one of said phase sensitive signal converting means for providing an output indicative of quantity of the substance being measured.

6. In fluid quantity apparatus for measuring the quantity of fluid in a container wherein the fluid may vary over wide limits of conductivity comprising, in combination:

capacitive bridge circuit means including sensor means, first and second rebalance means and output means, a signal received from said sensor means having both capacitive and resistive components when said sensor means is inserted in the fluid being measured, the relative amounts of said components depending upon the fluid composition;

first signal converting means including input and output means, said first signal converting means being responsive to said resistive signal component;

second signal converting means including input and output means, said second signal converting means being responsive to said capacitive signal component;

means connecting said bridge circuit output means to said input means of said first and second signal converting means;

power supplying means connected to said bridge circuit means and said first and second signal converting means for supplying power thereto;

means attached to said output means of said first signal converting means to said first rebalance means for minimizing the effect of said resistive signal component applied to said input means of said first signal converting means; and means attaching said output means of said second signal converting means to said second rebalance means for minimizing the effect of said capacitive signal component applied to said input means of said second signal converting means.

7. In apparatus for measuring the quantity of a substance in a container wherein the substance may vary over wide limits of conductivity to thereby introduce errors in a means comprising, in combination:

bridge circuit means including sensor means, first and second rebalance means and output means, said sensor means being adapted for providing both capacitive and resistive signal components when inserted in the substance being measured, the relative amounts depending upon the composition of the substance;

first signal converting means including input and output means, said first signal converting means being responsive to said resistive signal component;

second signal converting means including input and output means, said second signal converting means being responsive to said capacitive signal component;

means connecting said bridge circuit output means to said input means of said first and second signal converting means;

power supplying means connected to said bridge circuit means and said first and second signal converting means for supplying power thereto;

means attaching said output means of said first signal converting means to said first rebalance means for minimizing the effective resistive signal applied to said input means of said first signal converting means;

means attaching said output means of said second signal converting means to said second rebalance means for minimizing the effective capacitive signal applied to said input means of said second signal converting means; and means attached to the output means of one of said signal converting means and adapted to provide an output indicative of quantity of the substance in the container.

8. In a measuring system wherein the characteristics of the substance being measured may vary from insulative to conductive comprising, in combination:

bridge circuit means including sensor means, output means and first and second rebalance means, said sensor means being adapted for supplying a signal having resistive and capacitive components, the components being of two different phases, the relative magnitude of these components being indicative of the characteristics of the substance being measured, said first rebalance means being adapted for supplying a first rebalance signal being substantially opposite in phase from a first phase of said two phases and said second rebalance means being adapted for supplying a second rebalance signal of a phase substantially opposite from the second phase of said two phases;

first phase sensitive signal converting means including input means and output means, said input means of said first phase sensitive signal converting means being connected to said output means of said bridge circuit means for receiving said signals therefrom, said output means being attached to said first rebalance means for varying the magnitude of said first rebalance signal, said first phase sensitive signal converting means being responsive only to signal components of the first phase and to signal components of substantially opposite phase from said first phase;

second phase sensitive signal converting means including input means and output means, said input means of said second phase sensitive signal converting means being connected to said output means of said bridge circuit means for receiving said signals therefrom, said output means being attached to said second rebalance means for varying the magnitude of said second rebalance signal, said second phase sensitive signal converting means being responsive only to signal components of the second phase and to signal components of substantially opposite phase from said second phase; and indicator means attached to one of said phase sensitive signal converting means for providing an output indicative of quantity of the substance being measured.

References Cited by the Examiner
UNITED STATES PATENTS

| | | | |
|---|---|---|---|
| 2,530,619 | 11/1950 | Kliever | 73—304 |
| 2,537,498 | 1/1951 | Wickesser | 73—304 |
| 2,976,727 | 3/1961 | Prigozy | 73—304 |
| 3,114,262 | 12/1963 | Atun | 73—304 |

LOUIS R. PRINCE, *Primary Examiner.*